(12) United States Patent
Robertson et al.

(10) Patent No.: US 10,266,966 B2
(45) Date of Patent: Apr. 23, 2019

(54) ADHERING NANOFIBERS TO POLYMERIC MEDIA USING A HIGH TEMPERATURE SINGE

(71) Applicant: Nanomeld LLC, Circleville, OH (US)

(72) Inventors: John A. Robertson, Chillicothe, OH (US); Douglas J. Morgan, Ashville, OH (US); Stephen D. Ingle, Bainbridge, OH (US)

(73) Assignee: Knovation, Inc., Chillicothe, OH (US)

( * ) Notice: Subject to any disclaimer, the term of this patent is extended or adjusted under 35 U.S.C. 154(b) by 0 days.

(21) Appl. No.: 14/883,907

(22) Filed: Oct. 15, 2015

(65) Prior Publication Data

US 2018/0023215 A1    Jan. 25, 2018

(51) Int. Cl.

| | |
|---|---|
| *D01D 5/00* | (2006.01) |
| *B01D 46/00* | (2006.01) |
| *D01F 8/04* | (2006.01) |
| *D04H 3/11* | (2012.01) |
| *B01D 46/54* | (2006.01) |
| *B01D 39/16* | (2006.01) |

(52) U.S. Cl.
CPC ........... *D01D 5/003* (2013.01); *B01D 39/163* (2013.01); *B01D 46/0001* (2013.01); *B01D 46/546* (2013.01); *D01F 8/04* (2013.01); *D04H 3/11* (2013.01); *B01D 2239/0492* (2013.01); *B01D 2239/0631* (2013.01); *B01D 2239/1233* (2013.01); *D01D 5/0084* (2013.01)

(58) Field of Classification Search
CPC ............. B01D 46/0001; B01D 46/546; B01D 39/163; B01D 2239/492; B01D 2239/631; B01D 2239/1233; B29C 65/10; B29C 65/103

See application file for complete search history.

(56) References Cited

U.S. PATENT DOCUMENTS

2010/0206803 A1\*  8/2010  Ward ................. B01D 39/1623
                                                            210/491

\* cited by examiner

*Primary Examiner* — Robert Clemente
(74) *Attorney, Agent, or Firm* — Mueller Law, LLC; Jerry K. Mueller, Jr.

(57) ABSTRACT

A method of bonding a nanofiber web of nanofibers having diameters of between about 50 nanometers and about 2,000 nanometers onto a surface of a woven or nonwoven polymeric media having media fiber diameters of between about 700 nanometers and about 50,000 nanometers utilizes exposing the topmost layer of nanofibers and media fibers to a jet of heated air for a time and at a distance such that substantially only the topmost layer of fibers are bonded. The jet of heated air exits through a nozzle slot having a length of less than about 2 inches in the nanofiber web travel direction. The temperature of the heated air ranges from about 2 to about 10 times the nanofiber melting temperature, and heat air has a nozzle slot velocity of greater than about 500 feet/minute. An adhesive may bond the nanofibers, to a media, which may be bi-component fiber fibers.

6 Claims, 10 Drawing Sheets

ADHERING NANOFIBERS TO POLYMERIC MEDIA USING A HIGH TEMPERATURE SINGE

CROSS-REFERENCE TO RELATED APPLICATIONS

None.

STATEMENT REGARDING FEDERALLY SPONSORED RESEARCH

Not applicable.

BACKGROUND

Polymeric media with fibers having diameters of approximately 2 to 20 microns can be utilized to provide air filtration. The efficiency of such media in the collection of fine airborne particulates, especially airborne particulates in the range of 300 nanometers to 1 micron diameter (the so called E1 Group), can be enhanced by the addition of a nanofiber web layer atop the media. These nanofibers typically have diameters of approximately 50 to 2,000 nanometers on up to about 2 microns and are most commonly produced by electrospinning, which deposits them as a random web upon the media where they bridge openings in the media.

As applied, the nanofiber web is quite fragile in that it is bound to the substrate only by weak electrostatic and van der Waals forces. Prior proposals have utilized a thin protective scrim layer, adhesives, elevated media temperature, or a combination of these approaches to enhance the bonding. As will be explained below, each of those approaches either adds significant cost or increases airflow resistance or undesirably changes the media morphology. Disclosed is a novel method of nanofiber bonding that overcomes many of the prior art shortcomings.

BRIEF SUMMARY

A method of bonding a nanofiber web of nanofibers having diameters of between about 50 nanometers and about 2,000 nanometers onto a surface of a woven or nonwoven polymeric media having media fiber diameters of between about 700 nanometers and about 50,000 nanometers utilizes exposing the topmost layer of nanofibers to a jet of heated air for a time and at a distance such that substantially only the topmost layer of fibers are bonded. The jet of heated air exits through a nozzle slot having a length of less than about 2 inches in the process web travel direction. The temperature of the heated air ranges from about 2 to about 10 times the nanofiber or media fiber melting temperature, and heat air has a nozzle slot velocity of greater than about 500 feet/minute. If the media fibers are bi-component fiber fibers, the singe heating may melt the media fiber sheath, which then act as an adhesive to the nanofibers and the number of nanofiber contact point attachments is increased by the airflow induced deflection of the nanofiber below the media top datum.

BRIEF DESCRIPTION OF THE DRAWINGS

For a fuller understanding of the nature and advantages of the present disclosure, reference should be made to the detailed description taken in connection with the accompanying drawings, in which.

Figure 1:
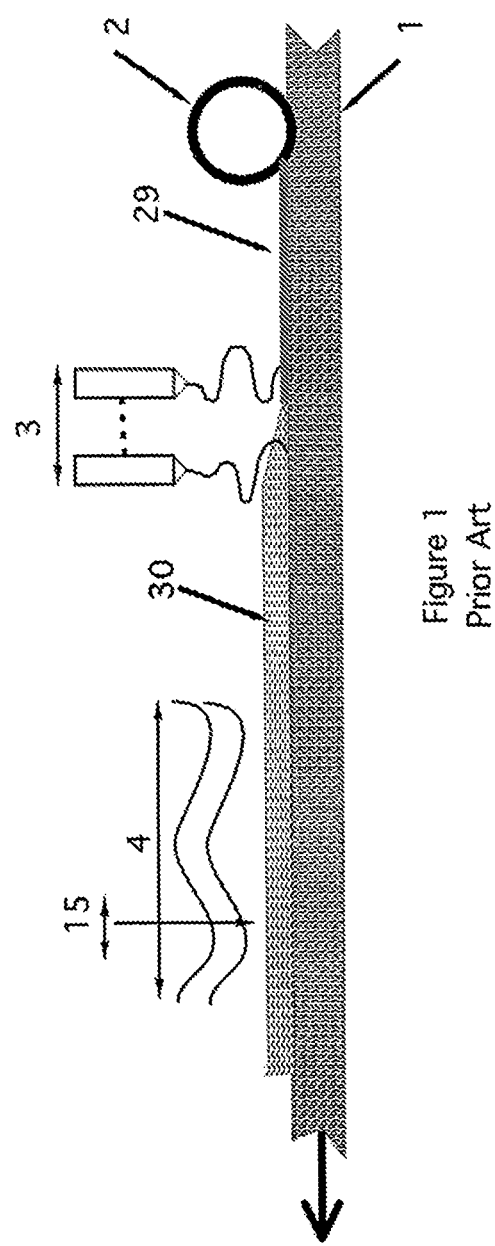
FIG. 1 depicts a prior art method of protecting nanofiber on a media using an adhesive applied to the topmost media fibers prior to nanofiber application followed by drying.

The drawings will be described in further detail below.

DETAIL DESCRIPTION

To better understand the disclosure, we will use the following terminology:

Media, as used herein, means the base nonwoven (or optionally woven) material, which is composed of intertwined fibers of what we will call the media fibers. As an example, we will look at media composed of polymeric fibers having fiber diameters of Dm, typically 0.7 to 50 microns. A typical media has a basis weight of between 1 and 10 oz/sq meter.

Nanofibers, as used herein, means very high length to diameter aspect ratio fibers applied as a web atop the media using electrostatic systems (e.g., electrospinning) and have typical diameters of Dn, typically between 50 nm and 2,000 nm and often between about 50 and 700 nm. Applied coat weights are typically between 0.01 to 2 grams per square meter.

Scrim, as used herein, means a nonwoven (or optionally woven) sheet, which is typically much thinner (lower basis weigh) than the media. Typical scrims have basis weights between 0.5 and 1 ounce per square meter.

A so-called Bi-component fiber fiber, as used herein, can be utilized in either the media or scrim or both. Each Bi-component fiber fiber has two components: typically an inner core and an outer sheath selected such that the outer sheath has a lower softening temperature than the core. Such Bi-component fiber fibers, thus, can be become pressure bonded to one another when the temperature of the touching fibers reaches the softening point of the sheath and the sheath thereby bond together while the core fibers maintain the structure.

The term morphology, as used herein, means physical characteristics of the final product. In typical air filtration applications, for example, the media fiber size and compactness determines both the filtration (or particle collection) efficiency and the undesirable resistance to airflow (fan energy increases). The addition of nanofibers and/or scrim and/or adhesives can affect the product morphology. Additionally, compression, fluffing, or constricting openings by temperature, adhesives, or pressure can significantly modify the morphology.

To better understand the disclosure, five prior art approaches to adhere and/or protect the nanofiber web will be initially introduced (FIGS. 1 thru 5). In the drawings, including those showing the inventive singe disclosure (FIGS. 6 through 8), it should be noted that, for teaching clarity, the layers are not to scale: nanofiber layers are typically less than 1/1000 of the media thickness and the adhesive or glue layers are typically on the order of 1/100 of the media thickness.

FIG. 1 depicts a media, 1, as it moves right to left. An applicator roll, 2 (transfer roll details not shown), applies a thin coating of an adhesive, 29, to the top fibers of media 1 prior to the deposition of nanofibers within an application area, 3 (not detailed here). The nanofibers, thus, are deposited onto the wetted topmost media fibers producing a layer, 30, consisting of adhesive and nanofibers. Heating and drying, (typically using a heated air oven and/or IR radiant heaters) shown as an area, 4, then dries the adhesive and attaches the nanofibers.

It is important to recognize that the adhesive must be applied very sparingly such that it does not bridge openings in the media when it dries, because the closure of openings in the media will greatly and negatively affect the air resistance of the media were it used as a air filter. We have found in practice that the prior art method described in FIG. 1 results in a nanofiber web wherein the nanofibers adhere to the topmost media adhesive wetted fibers but may bridge over many slightly lower media fibers, which lack significant adhesive or do not touch the nanofibers. This results in a nanofiber web, which does not survive handling or rollup well. We will propose a novel, additional step in the above process whereby an additional air blast will be applied to the nanofiber/glue interface near an area, 15, to assist in tacking nanofibers onto adhesively coated media fibers which lie below the media top datum.

Figure 2:
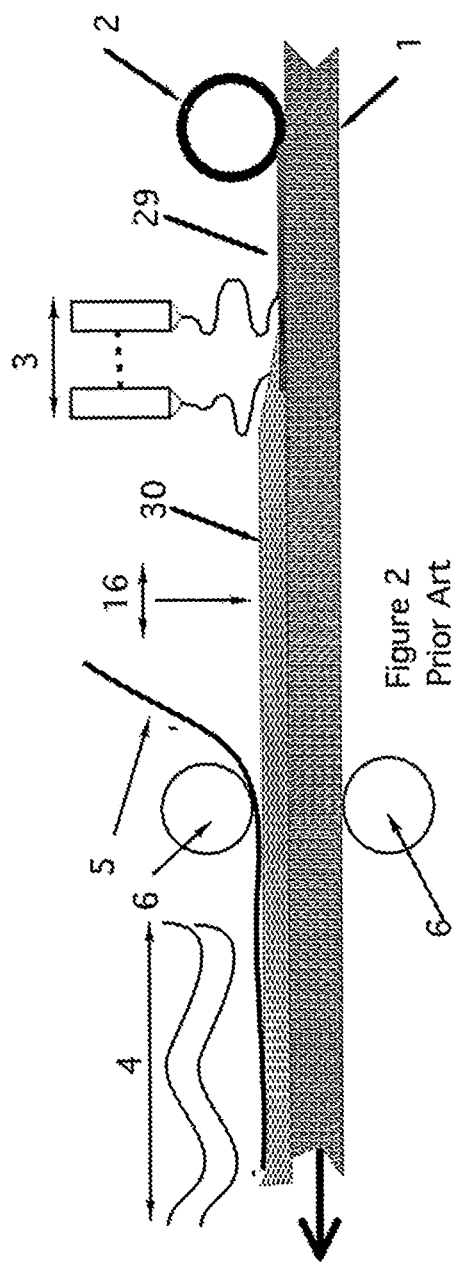
FIG. 2 depicts a prior art method of protecting nanofibers on a media using an adhesive applied to the topmost media fibers prior to nanofiber application followed by a protective scrim and drying.

FIG. 2 depicts prior art whereby media 1 moves right to left. Roll applicator 2 applies a thin coating of adhesive 29 to the top fibers of media 1 prior to the deposition of nanofibers in area 3 (not detailed here). The nanofibers then are deposited, onto possibly wetted media fibers and then are trapped by the addition of a protective scrim, 5, using pressure rollers, 6. Adhesive 29 also is utilized to affix the scrim. Heating and drying, as shown in area 4, then dries the adhesive, affixing the scrim and the scrim protected nanofibers. It is important to recognize that the adhesive and scrim must be applied very sparingly, as both negatively affect the air resistance of the media if it is used for air filtration. The addition of the scrim adds cost and increases airflow resistance of the product. We will propose a novel, additional step in the above process, whereby an additional air blast in an area, 16, will be applied to the nanofiber/glue interface prior to scrim covering to assist in tacking nanofibers onto adhesively coated media fibers which lie below the media top datum.

Figure 3:
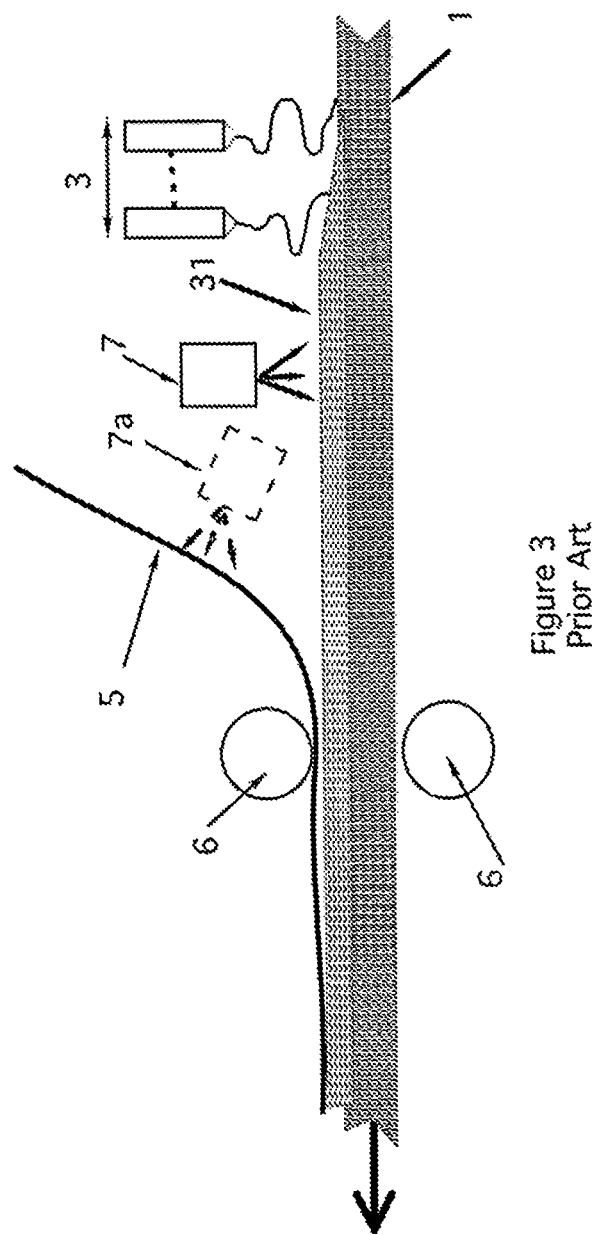
FIG. 3 depicts a prior art method of protecting nanofibers on a media using an adhesive applied to one or more of, the protective scrim fibers the media fibers or the nanofibers.

FIG. 3 depicts media 1 as it moves right to left. Nanofibers are first applied at area 3 and an adhesive is spray applied at an area, 7, onto the media. This spray adhesive may preferably be a hot melt adhesive sprayed using a nebulizing (especially, spiral pattern) nozzle. Alternatively, the adhesive may be applied to scrim 5 (shown dotted at an area, 7a). Two sprays at areas 7 and 7a also can be used simultaneously. The so-called open tack time of the adhesive is such that rollers 6 bond scrim 5 and media 1 and the nanofiber web is trapped (some of the nanofibers are adhesively attached). The open tack time is critical, as it is very undesirable to "block" the roll by sticking adjacent product layers as the product is wound up in the next step (or a take up roll). The addition of the scrim and hot melt adhesive adds cost and increases airflow resistance of the product. This approach requires no additional heated air or IR energy and, thereby, conserves both energy, and requisite line length at the expense of the glue and scrim costs and the associated resistance to airflow.

Figure 4:
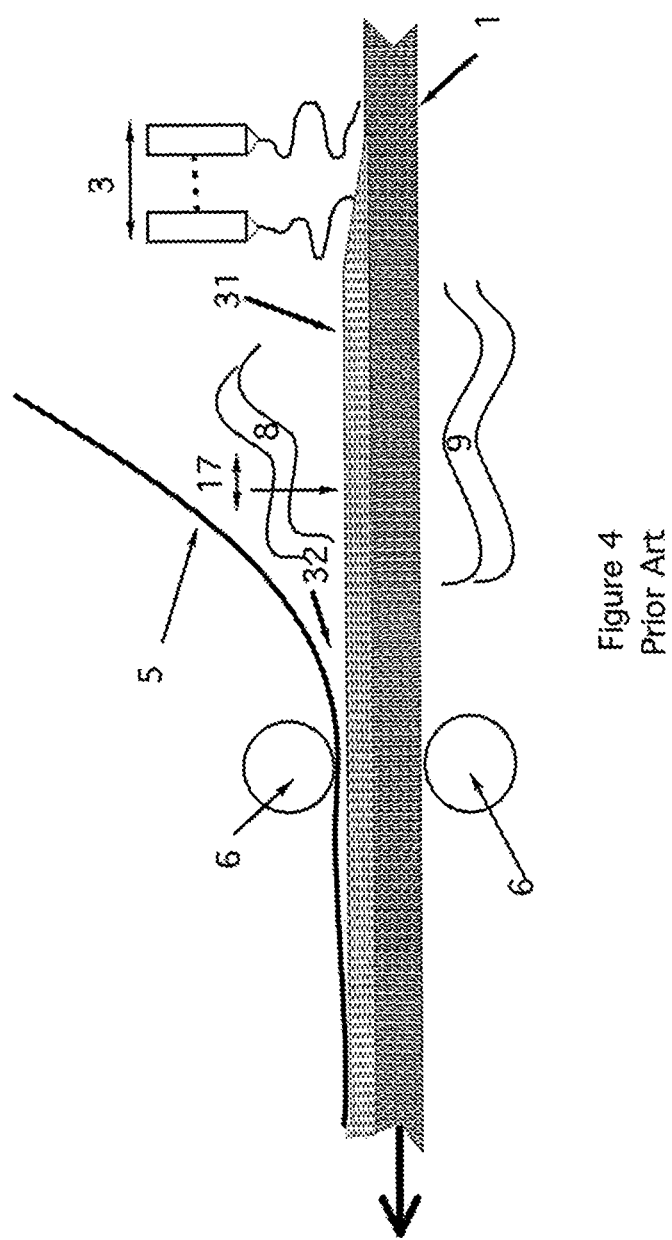
FIG. 4 depicts a prior art method of protecting nanofibers on a media by nanofiber application on the media followed by thermal bonding of a protective scrim and the media.

FIG. 4 depicts media 1 as it moves right to left. Nanofibers are first applied at area 3 as layer 31 and heat (heated air temperature or IR radiant) is used to raise the temperature of media 1 and/or scrim 5. One skilled in the art will appreciate that in order to assure adhesion of the scrim to the media, the media will need to be heated to a point where its topmost fibers soften. If the topmost surface of the media is not softened, the lower basis weight scrim will be unable to achieve a robust bond fusion. We, thus, show a heat source, 9, below the media and a heat source, 8, located atop media 1 and below scrim 5. Prior art has utilized areas 8 and 9 for heating and such heating is effective when applied over a relatively long distance (e.g., 3 ft or more at 120 feet per minute web speed). The heating must be controlled so that media and scrim are bondable in a nip point, 32, without either the scrim or media reaching a temperature whereby they would be stretched (necked) by the line tension. The heating also must be controlled so that media and scrim arrive bondable in nip point 32 without either the scrim or media or the nanofibers reaching a unnecessarily high temperature whereby their morphology is negatively affected.

In the prior art depicted in FIG. 4, it, thus, is preferred that the media 1 is Bi-component fiber. If media 1 or scrim 5 is not composed of Bi-component fiber fibers, raising media 1 or scrim 5 to a softening temperature of a one-component structure will likely produce unacceptable stretch (neck down) under practical web tensioning. Also, it should be noted that the addition of a scrim would increase (undesirable) airflow resistance. We propose a novel, additional step in the above process whereby an additional air blast in an area, 17, near nip 32 will be applied to the nanofibers prior to scrim covering to assist in tacking nanofibers onto softened coated media fibers which lie below the media top datum thereby increasing the robustness of the product when subsequently handled.

Figure 5:
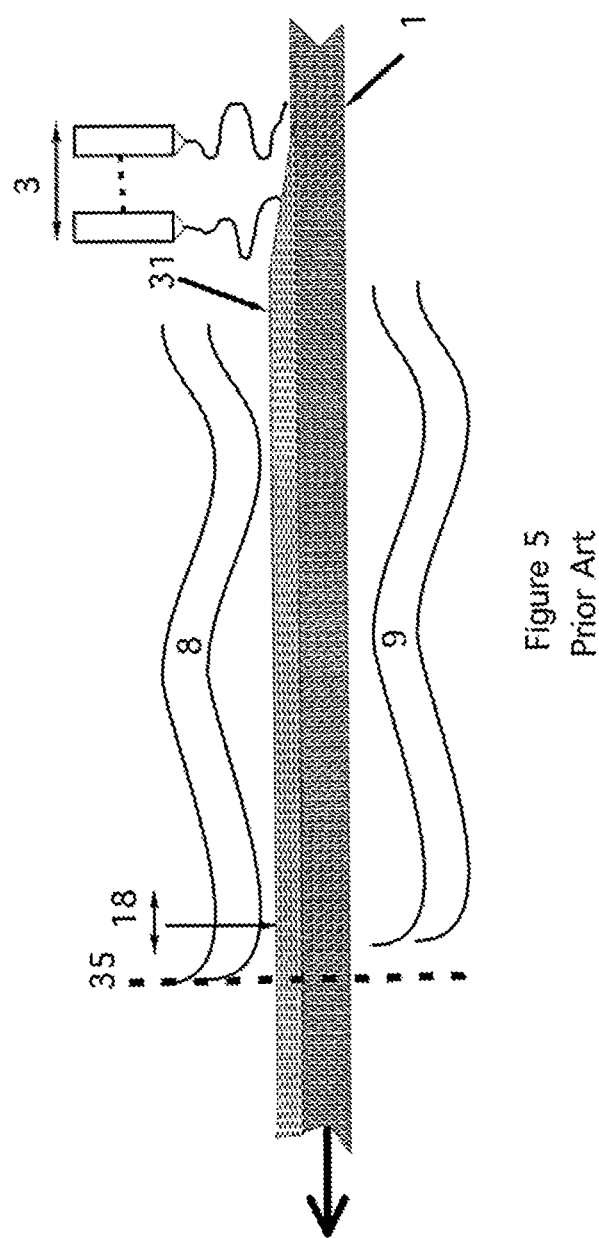
FIG. 5 depicts a prior art method of protecting nanofibers on a media by nanofiber application on the media followed by thermal bonding of the resting nanofibers by heat softening the media.

FIG. 5 depicts a heat only solution to bond nanofibers produced at area 3 as layer 31 by heating the media (and nanofibers) to the softening point of the media fibers. This approach has several shortcomings. First, the heating will require a relatively low temperature heat and significant length in the line if heating zones 8 and 9 are heating the media to reach the media softening temperature at an area, 35, without overheating any portion of the web. For example, typical heating for polyethylene-sheathed media (melt/soften at 120° C.) might require heating zones 8/9 at 150° C. and be 6 feet in length at 120 feet per minute line speed.

It should be noted that the heated air at zone or area 8 could heat moving web 1 if a vacuum were placed on the bottom of the web at zone or area 9 causing heated air to flow through the porous media. Optionally, heated air at area 9 could heat moving web 1 if a vacuum were placed on the top of the web at area 8 causing heated air to flow up through the porous media. Whether the optional vacuum is at area 8 or area 9, the practical flow through the media is at a low velocity due to the vacuum length and web width. For example, a 2000 cfm heated air source at area 8 with a vacuum at area 9 covering a 5 foot web length and a 4 foot wide web would produce a downward, through the nanofiber web, wafting flow velocity through the media of only 100 feet per minute.

It should also be noted that in the prior art method portrayed in FIG. 5, with or without a vacuum, there is no significant net downward force on the nanofibers to push them toward the softened media that lie below the top media datum. When a nanofiber bridges long distances, it remains fragile and the resultant product does not survive well (in a shipped roll or during filter pleating). We propose a novel, additional step in the above process whereby an additional air blast in an area, 18, near point 35 will be applied to the nanofibers ring to assist in tacking nanofibers onto softened coated media fibers that lie below the media top datum thereby increasing the robustness of the product when subsequently handled.

Figure 6:
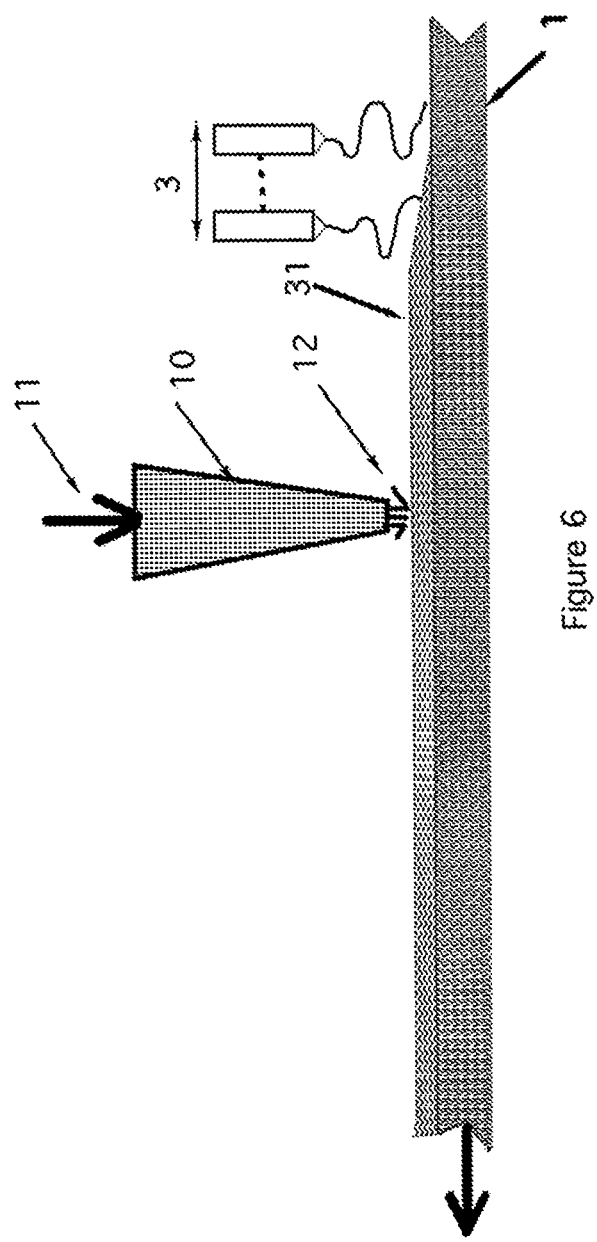
FIG. 6 depicts the disclosed method of protecting nanofibers on a media by nanofiber application on the media followed by a brief very hot air jet which singe softens or partially melts one or more of the media topmost fibers and the nanofibers while forcing the possibly softened nanofibers against the said softened or partially melted media fibers which then retain the nanofibers when they cool.
Figure 7:
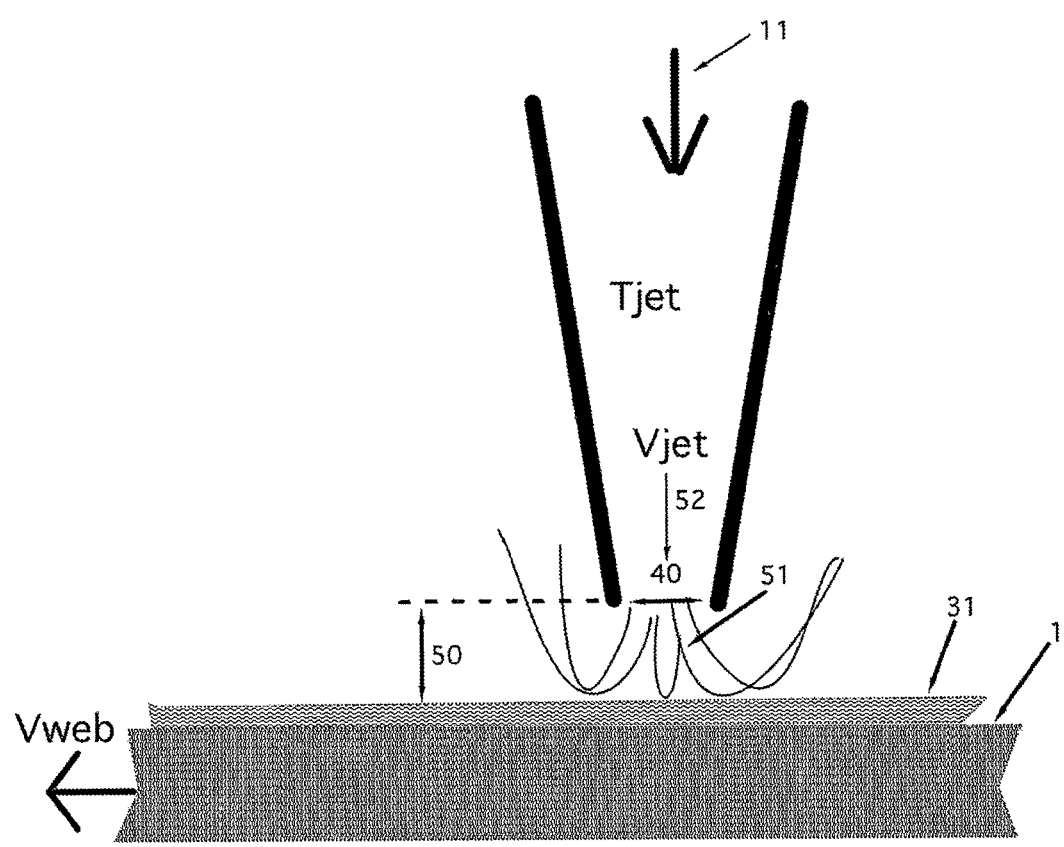
FIG. 7 is a close up view of the herein disclosed singe nozzle and introduces the important variables in singe bonding of nanofibers to the moving media.

FIG. 6 introduces the disclosed "singe" approach for bonding of nanofibers webs onto media. The nanofibers are spun onto the media at area 3 producing a nanofiber web at layer 31. The web covered media top is then confronted by a nozzle blast of high temperature air, 12, exiting a nozzle, 10, from a heated airflow, which feeds the nozzle from a feed point, 11. This brief "singe" tends to soften the topmost media fibers, those that will provide nanofiber attachment, without significant softening within the media bulk where morphology could be impacted. Additionally, the air blast tends to press down on the nanofiber web such that the nanofibers can be pressed against heat-softened media fibers that lie slightly below the media top datum, thereby reducing the bridging distances between nanofiber bond points; thereby, increasing the robustness of the web attachment FIG. 7 shows a cross section of the nozzle as viewed in the cross web direction. The arriving nanofiber web fibers 31 and the media fibers atop media 1 are confronted with a brief high temperature (Tjet) blast exiting from a nozzle having throat width, 40, as airflow (at velocity of Vjet, 52, at the nozzle throat) produces a flow shown as lines, 51. The nozzle to nanofiber/media spacing is shown as 50. Key to the effectiveness of the proposed singeing method is the proper setting of the variables Tjet, Vjet, Vweb, and spacing 50.

Figure 8:
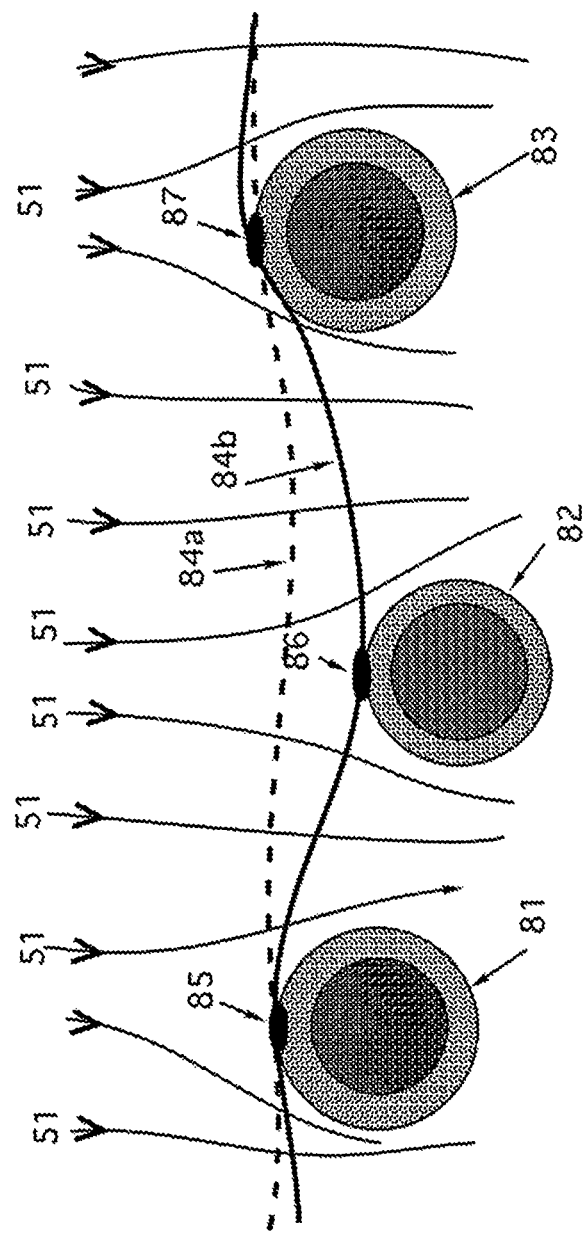
FIG. 8 presents the advantage of the proposed singe attachment in the way that forces the nanofibers downward against softened media fibers below the media top datum and thereby shortens the average nanofiber unsupported length.

FIG. 8 presents the advantage of the proposed singe attachment as it shortens the average nanofiber-unsupported length. Here, we show a cross section of three media fibers near top surface datum media (Bi-component fiber) fibers, 81, 82, and 83. A nanofiber, 84a, is shown as it would be electrospin deposited on the media top datum without the proposed singe heated airflow. The downward directed hot airflow from the proposed singe nozzle is shown as numerous airflow line, 51. The downward directed hot airflow simultaneously heats (softens or melts) the outer surface of media fibers 81, 82, and 83, while it deflects nanofiber 84a to lie as at 84b. The result of this simultaneous heating and displacement is to bond nanofiber 84 at three points, 85, 86, and 87; thereby, reducing the free nanofiber length compared to bonding only at 85 and 87. Reducing the free nanofiber length improves the durability of the product without significantly reducing the particle collection efficiency or the media morphology. One should recognize that there are many lower layers of media fibers (not shown).

Figure 9:
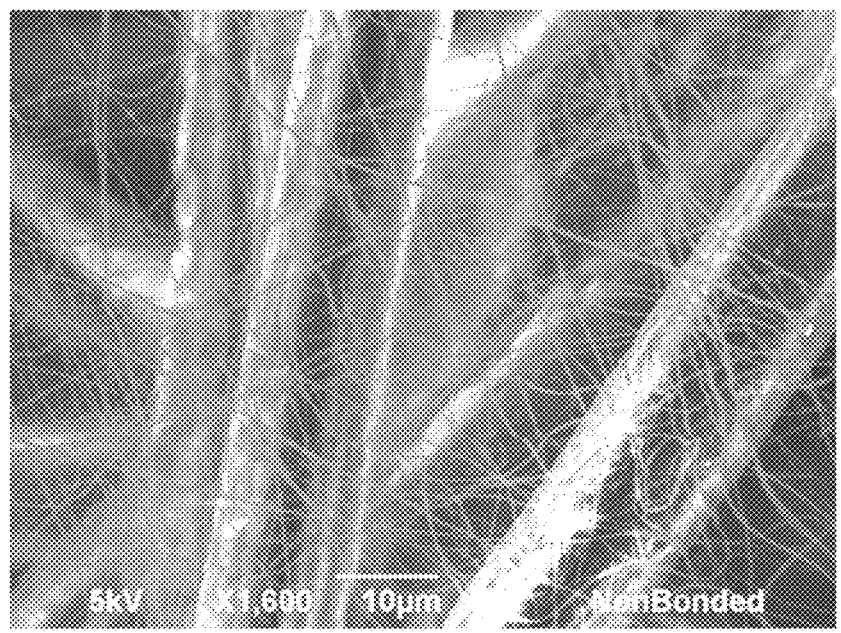
FIG. 9 is a photomicrograph of a PVOH (polyvinyl alcohol) nanofiber web resting on non-woven media fibers without attachment.
Figure 10:
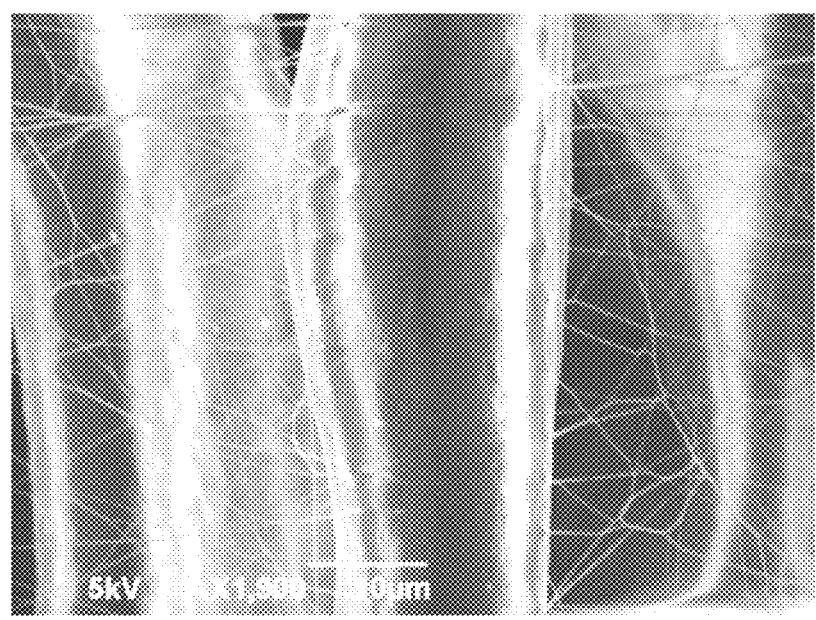
FIG. 10 is a photomicrograph of PVOH nanofibers embedded on media fibers after singe attachment.

FIG. 9 presents the nanofiber web atop the media with no nanofiber attachment beyond that provided by electrostatic or van der Waals forces. FIG. 10 presents the result of the disclosed singe attachment where fibers are encased in a cooled/hardened puddle on the media fibers. The effect is so pronounced that the nanofibers are clearly embedded within the molten media fiber puddle of the foreground media fiber and also embedded upon a lower media fiber (which is slightly out of focus) in this electron microscope image.

It should be noted that the disclosed method requires nanofibers with a melting point (or glass transition temperature) above that which will melt or soften the media fibers.

An instructive, working examples, as depicted in FIG. 9 (before bonding) and FIG. 10 (after bonding) utilized the following conditions:

- The Media consists of Bi-component fibers at 3-oz/square meter basis weight.
- The Web Speed is 120 ft/min.
- The Bi-component fiber Fibers have a Polypropylene Core (Melting point approx 130° C.
- The Bi-component fiber Fibers have a Polyethylene Sheath (Melting point approx 120° C.
- Nozzle width 40 in the web direction is 3 mm.
- Nozzle elevation 50=6 mm above the top datum of the media.
- The Nozzle air jet temperature is 538° C. (1000° F.).
- The nozzle flow jet CFMjet=2 cfm/inch crossweb.
- The nozzle air jet exit velocity Vjet=4800 ft/min.
- Nanofiber web 31 is PVOH fibers averaging 160 nm in diameter.
- The media fibers are Bi-component fiber with the core being polypropylene and the sheath being polyethylene, which average 15-micron (15,000-nm) diameter.

If one assumes that the hot air blast is effective over an in web direction distance of 3 times standoff distance 50, the nanofibers are attached in less than 30 milliseconds at 120 ft/min web velocity. It also should be noted that the proposed singe nozzle, as shown in FIG. 6, requires very little web line length when compared to the prior art methods.

We claim:

1. A method of bonding a nanofiber web of nanofibers having diameters of between about 50 nanometers and about 2,000 nanometers onto a surface of a woven or nonwoven polymeric media having media fiber diameters of between about 700 nanometers and about 50,000 nanometers, which comprises: exposing a topmost layer of nanofibers to a jet of heated air for a time and at a distance such that substantially only the topmost layer of nanofibers is bonded.

2. The method of claim 1, wherein the nanofiber coated web is moving and the jet of heated air exits through a nozzle slot having a length of less than about 2 inches in the nanofiber web travel direction.

3. The method of claim 2, wherein the media fibers have a melting temperature, the temperature of the heated air ranges from about 2 to about 10 times the media fiber's melting temperature, and the jet of heated air has a nozzle slot velocity of greater than about 500 feet/minute.

4. The method of claim 3, wherein said media fibers comprise bi-component fiber fibers.

5. The product produced according to the method of claim 1.

6. The product produced according to the method of claim 2.

* * * * *